United States Patent
Chen et al.

(10) Patent No.: US 12,057,781 B2
(45) Date of Patent: Aug. 6, 2024

(54) SIGNAL SAMPLING METHOD, SAMPLING CIRCUIT, INTEGRATED CIRCUIT AND SWITCHING POWER SUPPLY THEREOF

(71) Applicant: Silergy Semiconductor Technology (Hangzhou) LTD, Hangzhou (CN)

(72) Inventors: Zhan Chen, Hangzhou (CN); Jin Jin, Hangzhou (CN); Guiying Zhang, Hangzhou (CN); Hongxing Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/992,686

(22) Filed: Nov. 22, 2022

(65) Prior Publication Data

US 2023/0170813 A1    Jun. 1, 2023

(30) Foreign Application Priority Data

Nov. 30, 2021    (CN) .......................... 202111452189.4

(51) Int. Cl.
H02M 5/08    (2006.01)
H02M 1/00    (2006.01)

(52) U.S. Cl.
CPC ........... *H02M 5/08* (2013.01); *H02M 1/0009* (2021.05); *H02M 1/0045* (2021.05); *H02M 1/0087* (2021.05)

(58) Field of Classification Search
None
See application file for complete search history.

(56) References Cited

U.S. PATENT DOCUMENTS

| | | | |
|---|---|---|---|
| 7,227,277 B2 | 6/2007 | Chapman et al. | |
| 7,256,568 B2 | 8/2007 | Lam et al. | |
| 7,362,592 B2 * | 4/2008 | Yang .................. | H02M 3/33507 363/21.16 |
| 8,310,846 B2 | 11/2012 | Piazzesi | |
| 8,526,203 B2 * | 9/2013 | Huang .............. | H02M 3/33523 363/21.16 |
| 8,853,888 B2 | 10/2014 | Khaligh | |
| 8,917,528 B2 * | 12/2014 | Xu ......................... | H02M 3/335 363/21.13 |
| 9,130,460 B2 | 9/2015 | Sun et al. | |
| 9,257,916 B2 | 2/2016 | Cheng et al. | |
| 9,543,822 B2 | 1/2017 | Hang et al. | |
| 9,559,591 B2 | 1/2017 | Hang et al. | |
| 9,654,013 B2 * | 5/2017 | Chen ...................... | H02M 1/08 |
| 2007/0052397 A1 | 3/2007 | Thompson et al. | |
| 2008/0231115 A1 | 9/2008 | Cho et al. | |
| 2008/0258688 A1 | 10/2008 | Hussain et al. | |
| 2012/0153729 A1 | 6/2012 | Song et al. | |
| 2013/0063180 A1 | 3/2013 | Sun et al. | |

(Continued)

*Primary Examiner* — Jeffrey S Zweizig

(57) ABSTRACT

A sampling circuit for a switching power supply, can include: a first sampling circuit configured to acquire a first sampling signal of a current flowing through an inductor in the switching power supply; and a second sampling circuit configured to obtain a compensation signal with a same rising slope as the first sampling signal within a turn-off delay time of a power switch in the switching power supply, and to superimpose the compensation signal on the first sampling signal to generate a second sampling signal.

18 Claims, 8 Drawing Sheets

(56) References Cited

U.S. PATENT DOCUMENTS

| | | | |
|---|---|---|---|
| 2014/0211519 A1* | 7/2014 | Hsu | H02M 1/4258 |
| | | | 363/21.17 |
| 2015/0078045 A1 | 3/2015 | Zhang et al. | |
| 2016/0211745 A1 | 7/2016 | Hang et al. | |
| 2017/0025957 A1* | 1/2017 | Zhang | H02M 3/33507 |
| 2017/0063238 A1 | 3/2017 | Hang et al. | |
| 2017/0279279 A1 | 9/2017 | Shimada et al. | |
| 2018/0198361 A1 | 7/2018 | Seong et al. | |

* cited by examiner

| R5 | | Power (W) | Lp1 (uH) | Nps | Npa | Iout_ocp (A) | Rcs1 (ohm) | R5 (kohm) | t (ns) | ΔVcs1(Mv) Vbus1=80V | ΔVc1(Mv) Vbus1=80V | ΔVcs1(Mv) Vbus1=380V | ΔVc1(Mv) Vbus1=380V |
|---|---|---|---|---|---|---|---|---|---|---|---|---|---|
| max | Lp1(max) Rcs1(min) | 45 | 300 | 5 | 5 | 3.3 | 0.101 | 198 | 150 | 4 | 12 | 19 | 58 |
| min | Lp1(min) Rcs1(max) | 65 | 100 | 7 | 7 | 3.6 | 0.130 | 37 | 150 | 16 | 47 | 74 | 222 |

FIG. 7

# SIGNAL SAMPLING METHOD, SAMPLING CIRCUIT, INTEGRATED CIRCUIT AND SWITCHING POWER SUPPLY THEREOF

RELATED APPLICATIONS

This application claims the benefit of Chinese Patent Application No. 202111452189.4, filed on Nov. 30, 2021, which is incorporated herein by reference in its entirety.

FIELD OF THE INVENTION

The present invention generally relates to the field of power electronics, and more particularly to cascade circuits, and associated control methods and integrated circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

BRIEF DESCRIPTION OF THE DRAWINGS

FIG. 7 is a parameter schematic table of the example sampling circuit, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
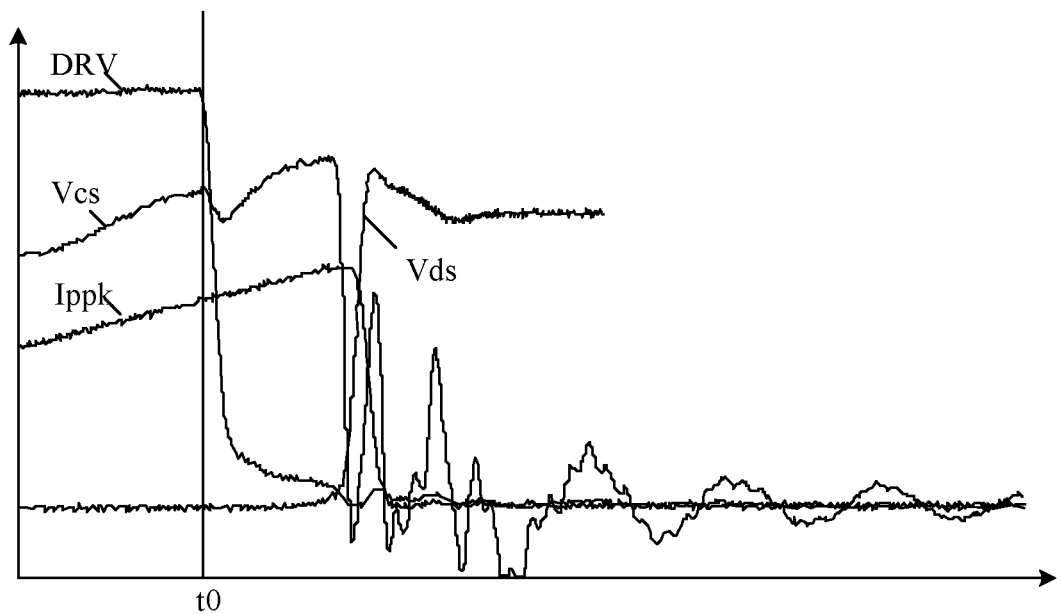
FIG. 1 is a waveform diagram of example operation of a sampling circuit.

In a switching power supply, it is typically necessary to sample a peak value of a current signal. Referring now to FIG. 1, shown is a waveform diagram of example operation of a sampling circuit. In this particular example, when control signal DRV of a power switch in the switching power supply drops at time t0, sampling signal Vcs representative of current signal Ippk flowing through the power switch may have undershoot noise. During this period, the power switch may not immediately be turned off, and a turn-off delay time can exist from time t0. Therefore, current signal Ippk may keep rising for a period of time until the power switch is completely turned off, and voltage signal Vds across the power switch can increase. Thus, the peak value of the current signal obtained by this sampling may be smaller than the real peak value of the current signal, and this sampling method may have a certain sampling error.

Figure 2:
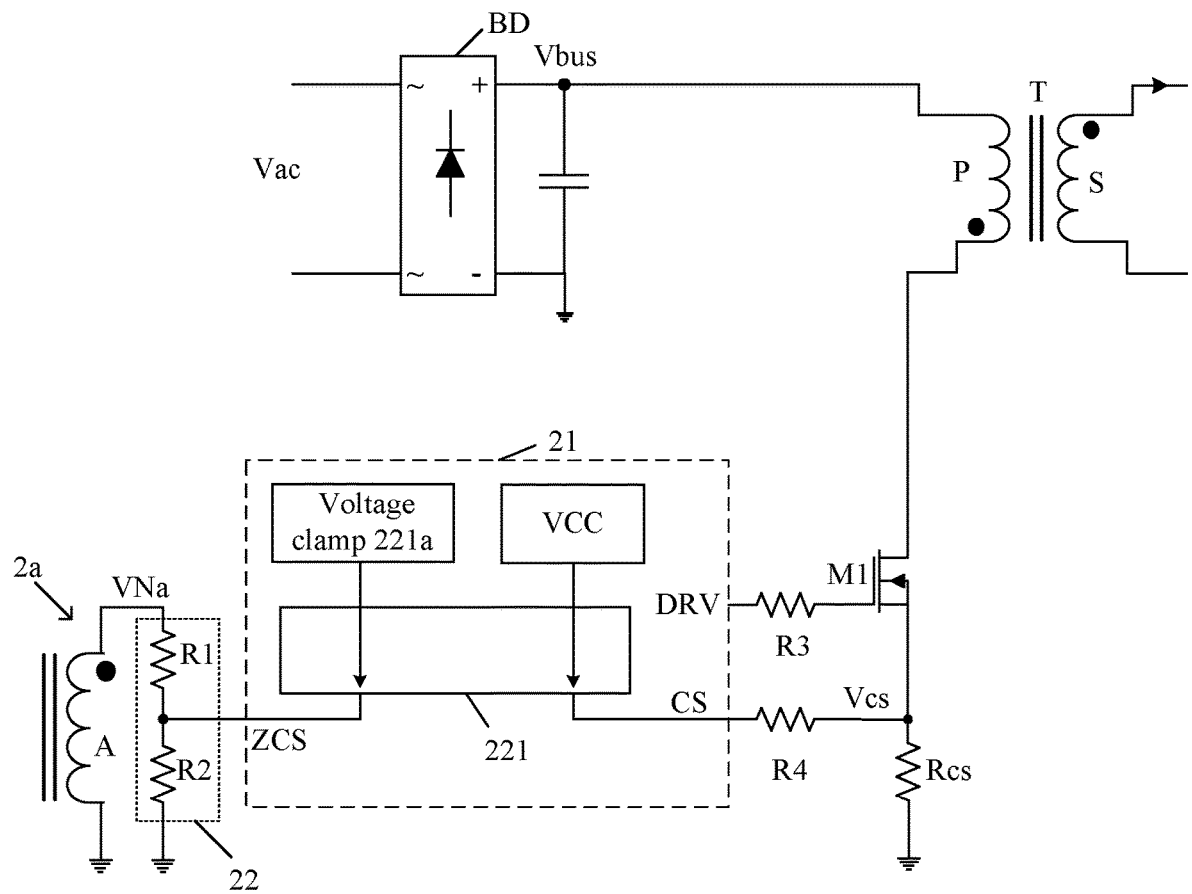
FIG. 2 is a schematic block diagram of a switching power supply.

Referring now to FIG. 2, shown is a schematic block diagram of a switching power supply. Taking a flyback switching power supply as an example. In this particular example, the switching power supply can include rectifier circuit BD, transformer T, power switch M, sampling resistor $R_{CS}$, external resistor R4, drive resistor R3, integrated circuit 21, and voltage divider circuit 22. Voltage divider circuit 22 can include resistors R1 and R2, and transformer T can include primary winding P, secondary winding S, and auxiliary winding A. Input alternating current voltage Vac may be rectified by rectifier circuit BD to output bus voltage Vbus.

Voltage signal VNa across auxiliary winding A can be transmitted to zero-crossing sampling pin ZCS of integrated circuit 21 after being divided by voltage divider circuit 22. The ZCS pin can be used for current and current zero-crossing detection. Integrated circuit 21 can generate control signal DRV for controlling power switch M according to voltage signal VNa across auxiliary winding A, in order to control the conduction time and switching frequency of power switch M, thereby controlling the constant voltage output of the switching power supply. When power switch M is turned on, a current may flow through power switch M, and integrated circuit 21 can obtain the voltage at both terminals of sampling resistor Rcs at the moment before power switch M is turned off, in order to obtain sampling voltage Vcs that characterizes the peak value of the current flowing through power switch M. Because power switch M has a turn-off delay time, the sampling action time of sampling resistance Rcs may have a certain delay relative to the actual turn-off time of power switch M, so this sampling method may also have a certain sampling error.

In one example, the sampling error can be compensated by external resistor R4 to accurately obtain sampling voltage Vcs. For example, integrated circuit 21 can include current mirror 221, voltage clamp 221a, and voltage source VCC. Voltage clamp 221a and voltage source VCC may provide the voltage of the input and output channels of current mirror 221. The output current of current mirror 221 can be transmitted to resistor R4 through sampling pin CS. The input and output ratio of the current mirror may be 10:1. As shown, the sampling error is $\Delta Vcspk\_s\&h$ during the process of turning off power switch M when control signal DRV is switched to a low level:

$$\Delta V \text{cspk\_s\&h} = \frac{Vbus}{Lp} * T\text{delay} * Rcs \qquad (1)$$

Here, Vbus is the bus voltage, Lp is the inductance of primary winding P of transformer T, and Tdelay is the turn-off delay time of power switch M. Sampling compensation ΔVcspk_comp is:

$$\Delta V cspk_{comp} = Vbus * \frac{Na}{Np} * \frac{1}{R1} * \frac{1}{10} * R4 \qquad (2)$$

Here, Vbus is the bus voltage, Na is the number of turns of auxiliary winding A of transformer T, and Np is the number of turns of primary winding P of the transformer. In order to achieve sampling compensation, sampling compensation ΔVcspk_comp is equal to sampling error ΔVcspk_s&h, and the equation can be shown below.

$$Vbus * \frac{Na}{Np} * \frac{1}{R1} * \frac{1}{10} * R4 = \frac{Vbus}{Lp} * T\text{delay} * Rcs \qquad (3)$$

$$\frac{T\text{delay} * Rcs}{Lp} = \frac{Na * R4}{Np * R1 * 10}$$

As shown in Formula (3), if current Iout_ocp (e.g., desired overcurrent protection point) in the switching power supply may become higher as AC input voltage Vac increases, and the resistance of external resistor R4 may need to be added to further compensate the sampling error. Moreover, the turn-off delay time of Cool-MOS can be much longer than that of GaN-MOS, so more compensation may be needed; that is, the resistance of external resistor R4 may need to be further increased. The switching power supply may thus adopt the method of increasing the external resistor to perform sampling compensation, which may not be suitable for circuit integration. In addition, the sealed chip may have a controller and a MOS switch inside the package, and sampling pin CS of the sealed chip may not be connected in series with a resistor. Therefore, the compensation approach of the sampling circuit shown in this example may not be suitable to a sealed chip. In particular embodiments, a sampling circuit can be provided to accurately sample and compensate without the external resistor, which can facilitate circuit integration and be suitable for sampling of various packaging chips.

Figure 3:
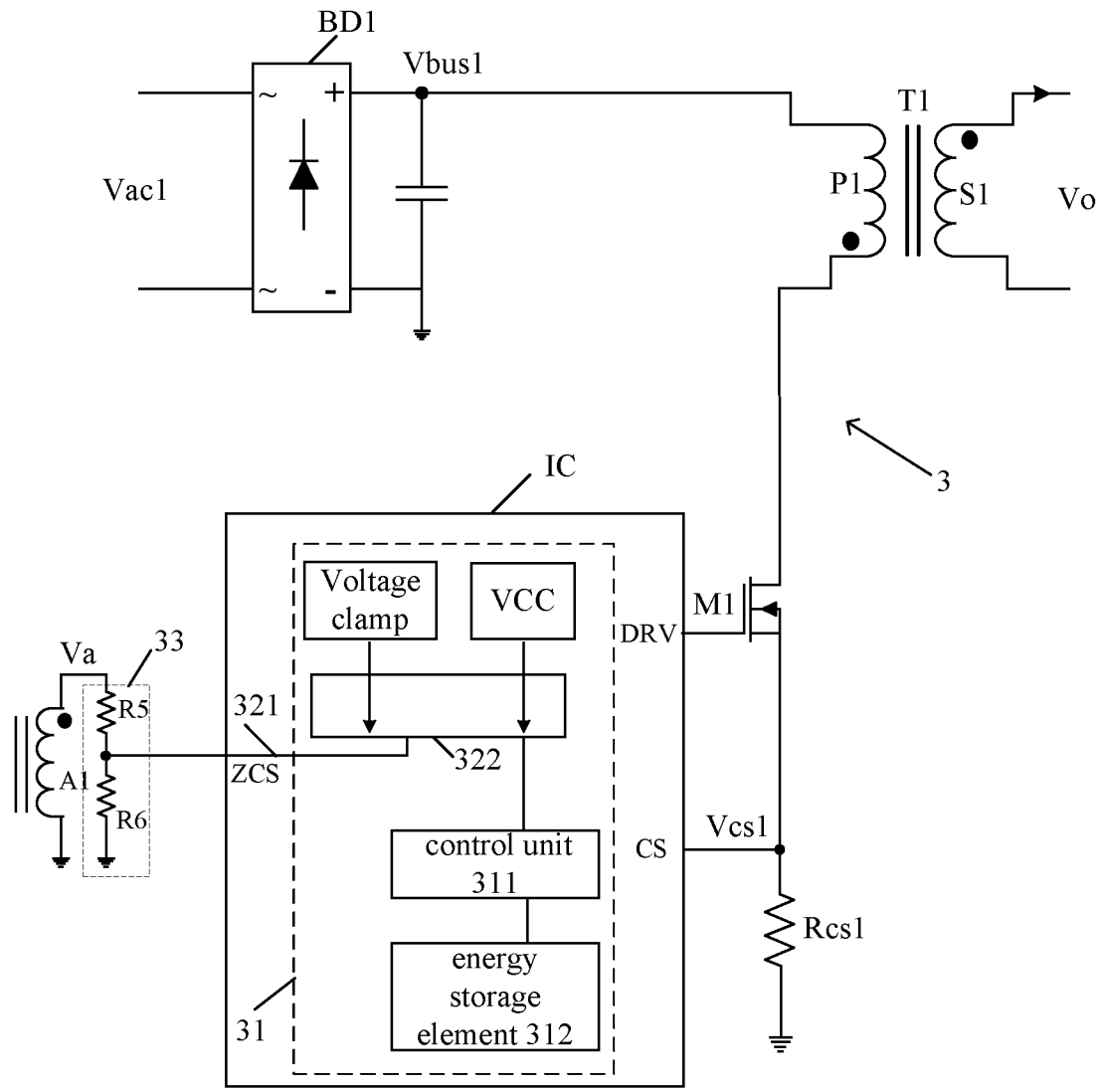
FIG. 3 is a schematic block diagram of a first example switching power supply, in accordance with embodiments of the present invention.

Referring now to FIG. 3, shown is a schematic block diagram of a first example switching power supply, in accordance with embodiments of the present invention. In this particular example, switching power supply 3 can include rectifier circuit BD1, transformer T1, integrated circuit IC, power switch M1, voltage divider circuit 33, and sampling resistor Rcs1. Among them, transformer T1 can include primary winding P1, secondary winding S1, and auxiliary winding A1. Input AC voltage Vac1 may be rectified by rectifier circuit BD1 to output bus voltage Vbus1 across a bus. Power switch M1 can be controlled by switch control signal DRV to switch state to maintain the output stability of switching power supply 3. Voltage divider circuit 33 can include resistors R5 and R6 that can connect in series between a terminal of the auxiliary winding and the grounding terminal, which can collect an electrical signal of auxiliary winding A1. The common terminal of resistors R5 and R6 can connect to integrated circuit IC.

In particular embodiments, a sampling circuit can include first and second sampling circuits. The first sampling circuit can acquire a first sampling signal of a current flowing through an inductor in the switching power supply. In order to facilitate sampling, the first sampling circuit can sample a current flowing through power switch M1 to generate the first sampling signal. Here, the inductor can be configured as primary winding P1. In this example, the sampling circuit can be configured as resistor Rcs1 connected in series between power switch M1 and a ground terminal, and sampling signal Vcs1 may be generated across resistor Rcs1. The second sampling circuit can obtain a compensation signal with the same rising slope as the first sampling signal within a turn-off delay time of a power switch in the switching power supply, and may superimpose the compensation signal on the first sampling signal, in order to generate a second sampling signal. In this example, the second sampling circuit can be integrated in integrated circuit IC, and integrated circuit IC may have a drive pin DRV for driving power switch M1, sampling pin CS for receiving sampling signal Vcs1, and zero-crossing sampling pin ZCS for performing zero-crossing detection on an electrical signal of auxiliary winding A1.

Integrated circuit IC can include sampling circuit 31 and a controller. Further, sampling circuit 31 may be utilized for current sampling, the controller can control the switching state of power switch M1, and can control the charging of the energy storage element in second sampling circuit 31 within the turn-off delay time of power switch M1 to obtain a compensation signal, in order to compensate the current sampling error and achieve accurate sampling. In another example, the controller can generate a sampling control signal to control sampling signal generating circuit 31 to obtain the sampling signal. In yet another example, the controller can control sampling circuit 31 for periodic sampling by the sampling control signal, in order to obtain the sampling signal.

Integrated circuit IC may have positive voltage detection function and negative voltage detection function. Further, when secondary winding S is freewheeling, the voltage signal at both terminals of auxiliary winding A1 can be positive voltage Va_P. that is, Va_P=(Na1/Ns1)*Vo, where Na1 is the number of turns of auxiliary winding A1, Ns1 is the number of turns of secondary winding S1, and Vo is the output voltage of the switching power supply. Therefore, the integrated circuit IC can obtain output voltage Vo of the switching power supply according to voltage signal Va_P of the auxiliary winding. In another example, integrated circuit IC can amplify the error according to output voltage Vo and a preset reference voltage to determine the conduction time and switching frequency of power switch M1 to achieve constant voltage output of the switching power supply. When power switch M1 is turned on, integrated circuit IC may obtain a voltage signal on sampling resistor Rcs1 at the moment before power switch M1 is turned off, in order to obtain sampling signal Vcs1 that characterizes the peak value of the current flowing through power switch M1. In some applications, since power switch M1 has a turn-off delay time, the time of the sampling action of sampling resistor Rcs1 may have a certain delay relative to the actual turn-off time of power switch M1, possibly resulting in inaccurate the peak current information of power switch M1. The current sampling error can be described as below.

$$\Delta Vcs1 = \frac{Vbus1}{Lp1} * t * Rcs1$$

Here, Lp1 is the inductance of primary winding P1 of transformer T1, and t is the turn-off delay time of power switch M1. During the conduction time of power switch M1, the voltage signal of auxiliary winding A1 can be negative voltage Va_N; that is, Va_N=(Na1/Np1)*Vbus1. Here, Na1 is the number of turns of auxiliary winding A1, Np1 is the number of turns of secondary winding P1, and Vbus1 is the bus voltage of the switching power supply. Therefore, integrated circuit IC can obtain output voltage Vo of the switching power supply according to voltage signal Va_N at both terminals of the auxiliary winding.

In addition, when power switch M1 is turned on, a negative current generated by pull-up resistor R5 at zero-crossing sampling pin ZCS of integrated circuit IC can reflect bus voltage Vbus. Therefore, this example can charge the at least energy storage element through the negative current inside integrated circuit IC. Further, the voltage of the energy storage element can characterize the actual current, so this example may compensate current sampling error ΔVcs1 by the voltage of the energy storage capacitor as the compensation voltage. Therefore, this example can realize accurate sampling error compensation without using external large resistor, which may be suitable for circuit integration and also reduce circuit cost.

In this example, sampling circuit 31 can include control unit 311 and at least one energy storage element 312. Control unit 311 can control the (at least one) energy storage element 312 to charge within the turn-off delay time of power switch M1, to obtain the capacitor voltage after charging to obtain the compensation signal, and to compensate the collected sampling signal Vcs1, in order to improve the accuracy of the sampling of the peak current. Particular embodiments may not need a relatively large external resistor, which may be suitable for circuit integration and reduce the circuit volume and cost. For example, the energy storage element can be configured as a charging capacitor. The compensation signal on charging capacitor may begin to increase linearly when control signal at dive pin DRV that controls the power switch to turn off is detected, and can stop increasing linearly when a zero crossing from positive to negative is detected for the current flowing through the inductor. In another example, sampling circuit 31 can include detection circuit 321 and current mirror 322. Detection circuit 32 can include zero-crossing sampling pin ZCS, which can detect an electrical signal of auxiliary winding A1, and may perform zero-crossing detection on the electrical signal of auxiliary winding A1.

As shown in FIG. 3, voltage signal Va of auxiliary winding A1 can be transmitted to zero-crossing sampling pin ZCS of integrated circuit IC after being divided by voltage divider circuit 33, and zero-crossing sampling pin ZCS can be used for current zero-crossing detection. In another example, since the voltage signal of the auxiliary winding A1 of transformer T1 is negative during the conduction time of power switch M1 and positive during the turn-off time of power switch M1, the turn-off delay time of power switch M1 can be determined by detecting the electrical signal of the auxiliary winding. In this example, integrated circuit IC can perform zero-crossing detection by detecting zero-crossing sampling pin ZCS of detection circuit 321 to determine the actual turn-off moment of power switch M1. Further, detection circuit 321 can detect the zero-crossing point of the electrical signal of auxiliary winding A1 through zero-crossing sampling pin ZCS, in order to control the sampling control signal generated by the controller to switch to a low level.

Sampling circuit 31 can stop charging the energy storage element in response to the sampling control signal switching to a low level. It should be understood that this example may not limit the turn-off delay time of the power switch and the manner of turning off the power switch. In this example, current mirror 322 can determine the charging current of the energy storage element based on the electrical signal of auxiliary winding A1. Further, current mirror 322 can mirror the current signal collected by zero-crossing sampling pin ZCS, in order to determine the charging current of the energy storage element 32 within the turn-off delay time of the power switch.

In particular embodiments, the rising slope of the compensation signal can be the same as the rising slope of the sampling signal, in order to facilitate the compensation signal to compensate the sampling signal. Further, by regulating resistor R5 in voltage divider circuit 33, the rising slope of the compensation signal can be the same as the rising slope of the sampling signal. For example, the energy storage element can be a capacitor, but any type of energy storage element can be utilized in certain embodiments. In one example, the energy storage element can include a first energy storage element, which can be charged within the turn-off delay time of power switch M1 to obtain the compensation signal.

In particular embodiments, control unit 311 can include a first switch coupled to the first energy storage element. The first switch can be turned on during the turn-off delay time of power switch M1, in order to control the first energy storage element to be charged, in order to obtain the compensation signal. In another example, when integrated circuit IC switches the charging control signal to a high level at a falling edge of the control signal at drive pin DRV of power switch M1, the first switch can be controlled to be turned on. When a zero-crossing signal at zero-crossing sampling pin ZCS is detected; that is, the electrical signal of the auxiliary winding switches from negative to positive, power switch M1 can be completely turned off, and the first switch controlled to be turned off. Here for example, when the control signal at drive pin DRV is a high level, power switch M1 can be controlled to be turned on, and when control signal at drive pin DRV is at a low level, power switch M1 can be controlled to be turned off. Thus, integrated circuit IC can control the first switch to be turned on within the turn-off delay time of power switch M1, thereby controlling the first energy storage element to be charged.

In another example, the charging current of the energy storage element can be determined based on bus voltage Vbus1. Since the electrical signal across auxiliary winding A1 can characterize bus voltage Vbus1, and bus voltage Vbus1 can characterize a bus current flowing through the bus during the conduction time of power switch M1, current mirror 322 in integrated circuit IC may determine the charging current of the first energy storage element based on the collected electrical signal of the auxiliary winding, such that the voltage of the first energy storage element after charging can characterize the actual current signal.

In yet another example, at least one energy storage element can include first and second energy storage elements. Control unit 311 can also include second and third switches. The second switch can connect between sampling pin CS and the second energy storage element, and the third switch can connect between the first energy storage element and the second energy storage element. The second and third switches can be controlled to be turned on by the sampling control signal, and controlled to be turned off by the falling edge of the control signal at drive pin DRV of power switch M1, in order to control the charging of the first and second energy storage elements to obtain the first sampling signal. Further, before the time of the falling edge of the control signal at drive pin DRV, the second and third switches can be controlled to be turned on to obtain sampling signal Vcs1. At the moment of the falling edge of the control signal at drive pin DRV, the first sampling signal may have undershoot noise by adopting other sampling approaches. Therefore, particular embodiments can control the first switch to be turned on and charge the first energy storage element (e.g., first capacitor) through the charging current determined by the electrical signal of the auxiliary winding, in order to obtain the compensation signal. Thus, particular embodiments can obtain the sampling signal of the current flowing through power switch M1 more accurately than other approaches.

In particular embodiments, control unit 311 can also include a first amplifier, which can amplify a predetermined multiple of the first sampling signal, or amplify a predetermined multiple of the compensation signal, in order to compensate the first sampling signal according to the compensation signal. In one example, control unit 311 can also include first and second resistors that can connect in series between the first switch and the ground terminal. Here, the resistance ratio of the first and second resistors can be a first predetermined value. In particular embodiments, the first input terminal of the first amplifier can connect to the second energy storage element, and the second input terminal of the first amplifier can connect to the common node of the first and second resistors, such that the first amplifier can amplify the predetermined multiple of the first sampling signal or the compensation signal, thereby further facilitating the compensation of the sampling signal according to the compensation signal.

In particular embodiments, the control unit of the second sampling circuit can charge the energy storage element within the turn-off delay time of the power switch, in order to determine the compensation signal according to the voltage of the energy storage element completed by charging, thereby compensating the first sampling signal according to the compensation signal. Therefore, this sampling method can accurately obtain the compensation signal within the turn-off delay time of the power switch by charging the energy storage element inside the integrated circuit, and without the large external resistor, which be suitable for circuit integration and reduce circuit volume and cost. Further, the sampling circuit of particular embodiments can be applied to the sealed chip to realize the sampling compensation of the sealed chip.

Figure 4:
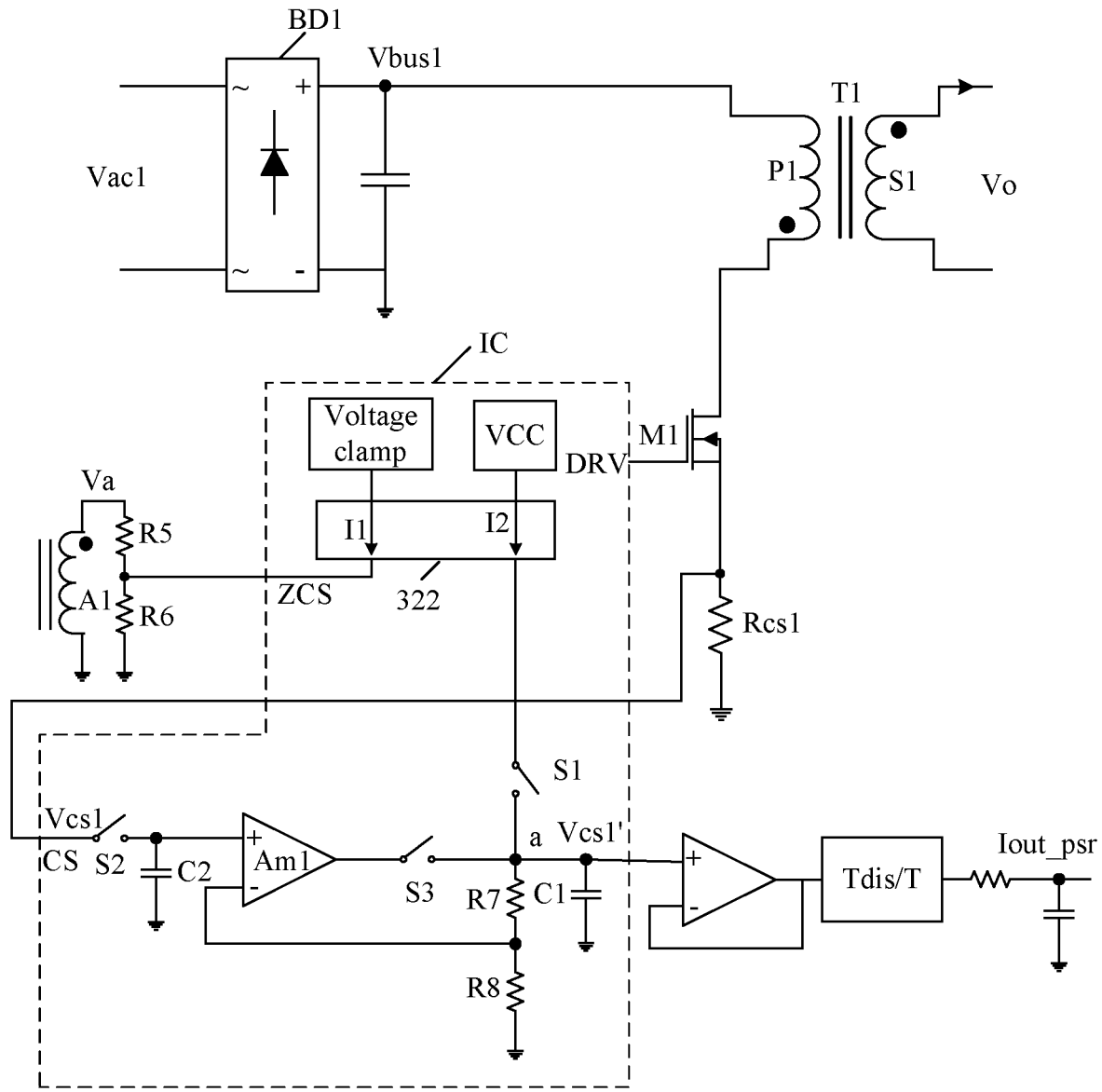
FIG. 4 is a schematic block diagram of a first example sampling circuit, in accordance with embodiments of the present invention.

Referring now to FIG. 4, shown is a schematic block diagram of a first example sampling circuit, in accordance with embodiments of the present invention. In this example, the energy storage element is a capacitor, and the first sampling signal is amplified by a predetermined multiple. As shown, the sampling circuit is applied to a switching power supply, and integrated circuit IC in the switching power supply can include current mirror 322. Integrated circuit IC can include zero-crossing sampling pin ZCS that can connect to a common node of resistors R5 and R6 to acquire voltage signal Va of auxiliary winding A1.

In this example, sampling circuit 31 can include capacitor C1, capacitor C2, and control unit 311. Control unit 311 can include switch S1, switch S2, switch S3, amplifier Am1, and resistors R7 and R8. The series path of resistor R7 and R8, and capacitor C1 can connect between the output terminal of current mirror 322 and the grounding terminal. Switch S1 can connect between the output terminal of current mirror 322 and capacitor C1, switch S2 can connect between sampling pin CS of integrated circuit IC and capacitor C2, capacitor C2 can connect between switch S2 and the non-inverting input terminal of amplifier Am1, and switch S3 can connect between the output terminal of amplifier Am1 and common node a. Here, common node a is the common node of switch S1, capacitor C1, and resistor R7.

Within conduction time Ton of power switch M1; that is, the time length during which when the control signal at drive pin DRV is high, switches S2 and S3 can be controlled to maintain the on-state, and switch S1 can be controlled to maintain the off-state, such that sampling signal Vcs1 is sampled into capacitors C1 and C2, in order to obtain sampling signal Vcs1 in real time. In another example, the ratio of resistors R7 and R8 is set to 2:1 such that the signal sampled by capacitor C1 is 3*Vcs1 based on amplifier Am1; that is, sampling signal Vcs1 can be increased by 3 times. In certain embodiments, the ratio of resistors R7 and R8 can be set to any suitable values. At the moment when the control signal at drive pin DRV of power switch M1 switches to a low level (e.g., the moment when power switch M1 is turned off), switches S2 and S3 can be turned off, and switch S1 turned on. Since switches S2 and S3 are turned off, the undershoot noise generated at time t0 in FIG. 4 may no longer affect the result of the sampling signal; that is, it may not affect the voltage of capacitor C1.

After switch S1 is turned on, current I1 generated at the ZCS pin can be mirrored as current I2 after passing through current mirror 322 to continue charging capacitor C1 through switch S1 until a current zero-crossing point is detected at the ZCS pin. After the current zero-crossing point is detected; that is, power switch M1 is completely turned off, switch S1 can be controlled to be turned off and current mirror 322 may stop charging capacitor C1. At this time, switches S1, S2, and S3 may all be in the off state, and the voltage on capacitor C1 may no longer be rising. The voltage on capacitor C1 can be extracted to obtain the compensation signal. After the first sampling signal is compensated according to the compensation signal, sampling signal Vcs1' can be obtained on capacitor C1, and subsequent processing (e.g., amplification processing, module processing, etc.), the peak value of the sampling signal, and primary side feedback current Iout_psr can be obtained. The switching power supply can also be adjusted according to primary side feedback current Iout_psr. In this example, input current I1 of current mirror 322 can be expressed as follows.

$$I1 = Vbus1/Np1*Na1*1/R5 \quad (4)$$

Output current I2 of current mirror 322 can be expressed as follows.

$$I2 = I1/k \quad (5)$$

Here, k is the ratio of the input current to the output current of current mirror 322, which can be set according to particular requirements. Charge amount $\Delta Vc1$ (e.g., compensation signal) of capacitor C1 during the turn-off delay time of the power switch can be expressed as follows.

$$\Delta Vc1 = I2/C1 * t \quad (6)$$

Here, t is the turn-off delay time of power switch M1. The error of the sampling signal obtained by capacitor C1 can be expressed as follows.

$$3*\Delta Vcs1 = 3*Vbus1/Lp1*Rcs1*t \quad (7)$$

According to the compensation signal to compensate the sampling error, then:

$$\Delta Vc1 = 3*\Delta Vcs1$$

That is, $I2/C1=3*Vbus1/Np1*Rcs1$ (8)

According to Formulas (4)-(8), we can get:

$R5=Lp1/(3*k*Rcs1*C1*Npa)$ (9)

Figure 5:
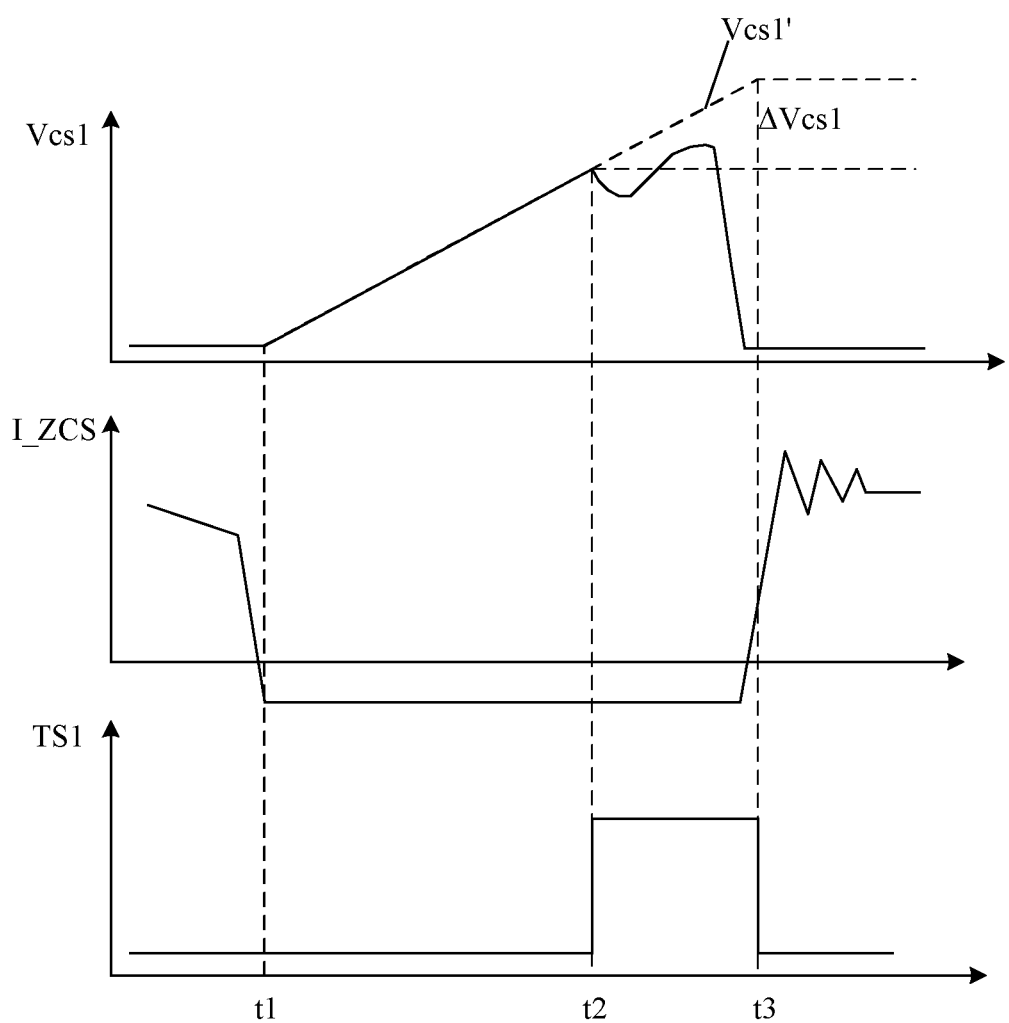
FIG. 5 is a waveform diagram of example operation of the sampling circuit, in accordance with embodiments of the present invention.

Here, Lp1 is the inductance of primary winding P1 of transformer T1, and Npa is the turn ratio of primary winding P1 to auxiliary winding A1. In this example, resistance value of resistor R5 can be calculated according to Formula (9), and the sampling error can be compensated, such that the rising slope of the compensation signal is the same or approximately the same as that of sampling signal Vcs1. However, a certain deviation between the actual value and the theoretical value of resistor R5 can exist in particular applications. Therefore, after calculating the resistance value of the pull-up resistor R5, the resistance value of the pull-up resistance R5 can be fine-tuned, such that the rising slope of the compensation signal is the same as that of sampling signal Vcs1, and the sampling accuracy is further improved Referring now to FIG. 5, shown is a waveform diagram of example operation of the sampling circuit, in accordance with embodiments of the present invention. In this particular example, at time t1, power switch M1 can be controlled to be turned on, and current I_ZCS detected at zero-crossing sampling pin ZCS can decrease to a negative current. In this way, switches S2 and S3 may be controlled to be turned on, and sampling signal Vcs1 can be obtained through capacitors C1 and C2. At time t2, control signal DRV of power switch M1 may become low; that is, power switch M1 can be controlled to start the turn off operation, sampling control signal TS1 can be switched to a high level, and undershoot noise in sampling signal Vcs1 may appear. Thus, switch S1 can be controlled to be turned on by sampling control signal TS1, switches S2 and S3 may be controlled to be turned off, and charging current I2 can start to charge capacitor C1 until time t3.

The zero-crossing point of current I_ZCS at zero-crossing sampling pin ZCS may be detected at time t3, power switch M1 may have been completely turned off, and sampling control signal TS1 can be switched to a low level. Switch S1 can be controlled to be turned off by sampling control signal TS1, and capacitor C1 may no longer be charged. The voltage on capacitor C1 can be compensated as the compensation signal to obtain sampling signal Vcs1'. Thus, capacitor C1 can be continuously charged by the current at zero-crossing sampling pin ZCS within the turn-off delay time of power switch M1 to compensate the sampling error, without additional large external resistor(s), which can save cost and facilitate circuit integration.

In particular embodiments, the control unit of the sampling circuit can charge the energy storage element within the turn-off delay time of the power switch, in order to determine the compensation signal according to the voltage of the energy storage element completed by charging, thereby compensating the sampling signal according to the compensation signal. Therefore, this sampling method can accurately obtain the compensation signal by charging the energy storage element within the turn-off delay time of the power switch through the current inside the integrated circuit, may reduce the circuit cost, can facilitate circuit integration, and may reduce the circuit volume.

Figure 6:
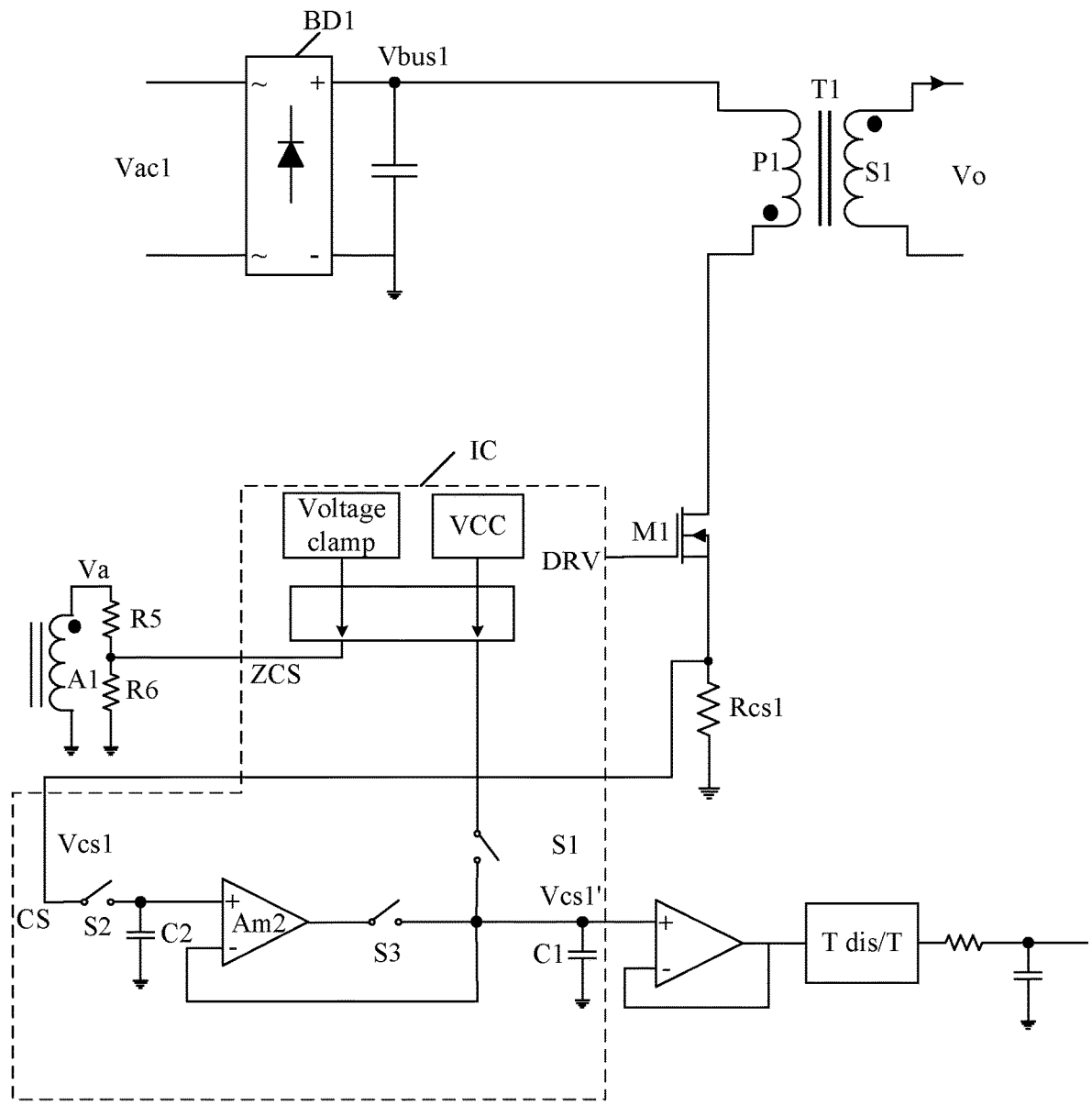
FIG. 6 is a schematic block diagram of a second example sampling circuit, in accordance with embodiments of the present invention.

Referring now to FIG. 6, shown is a schematic block diagram of a second example sampling circuit, in accordance with embodiments of the present invention. In this particular example, a sampling method without amplifying sampling signal Vcs1 is provided. That is, as compared with the sampling circuit shown in FIG. 4, the inverting input terminal of amplifier Am2 may be directly connected to capacitor C1. This sampling circuit may not amplify the first sampling signal, and can further reduce the circuit cost and save space while realizing the compensation for sampling error.

In particular embodiments, the control unit of the sampling circuit can charge the energy storage element within the turn-off delay time of the power switch, in order to determine the compensation signal according to the voltage of the energy storage element completed by charging, thereby compensating the sampling signal according to the compensation signal. Therefore, this sampling method can also accurately obtain the compensation signal by charging the energy storage element within the turn-off delay time of the power switch through the current inside the integrated circuit, may reduce the circuit cost, can facilitate circuit integration, and may reduce the circuit volume.

Referring now to FIG. 7, shown is a parameter schematic table of the example sampling circuit, in accordance with embodiments of the present invention. Based on any of the above examples, the results of calculating the maximum and minimum values of each parameter are shown according to the calculation formula of resistor R5 in Formula (9): $R5=Lp1/(3*k*Rcs1*C1*Npa)$. Here, Nps is the turn ratio of the primary winding and the secondary winding of the transformer, Iout_ocp is an expected overcurrent protection point, ΔVcs1 is the increase of sampling signal Vcs1 within the turn-off delay time of the power switch, and the unit of increase ΔVcs1 is mV, and ΔVc1 is the rising amplitude of the voltage across capacitor C1 in the example within the turn-off delay time of the power switch, and the unit of rising amplitude ΔVc1 is mV. Further, rising amplitude ΔVc1 of the voltage across capacitor C1 has been amplified by 3 times here.

Under the condition of the maximum of pull-up resistor R5 in the voltage divider circuit being 198 kohm, when bus voltage Vbus1 is equal to 80V, increase ΔVcs1 of sampling signal Vcs1 within the turn-off delay time can be equal to 4 mV (e.g., not amplified 3 times), and rising amplitude ΔVc1 of the voltage across capacitor C1 may be equal to 12 mV (e.g., amplified 3 times), thus the sampling error can be matched with the compensation signal. When bus voltage Vbus1 is equal to 380V, increase ΔVcs1 of sampling signal Vcs1 within the turn-off delay time can be equal to 19 mV (e.g., not amplified 3 times), and rising amplitude ΔVc1 of the voltage across capacitor C1 can be equal to 58 mV (e.g., amplified 3 times), thus the sampling error may approach to the compensation signal, and can essentially be matched with the compensation signal.

Under the condition of the minimum of pull-up resistor R5 in the voltage divider circuit being 37 kohm, when bus voltage Vbus1 is equal to 80V, increase ΔVcs1 of sampling signal Vcs1 within the turn-off delay time can be equal to 16 mV (e.g., not amplified 3 times), and rising amplitude ΔVc1 of the voltage across capacitor C1 may be equal to 47 mV (e.g., amplified 3 times), thus the sampling error can approach to the compensation signal, and may be matched with the compensation signal basically. When bus voltage Vbus1 is equal to 380V, increase ΔVcs1 of sampling signal Vcs1 within the turn-off delay time can be equal to 74 mV (e.g., not amplified 3 times), and rising amplitude ΔVc1 of the voltage across capacitor C1 may be equal to 222 mV (e.g., amplified 3 times), thus the sampling error can be matched with the compensation signal. Thus, regardless of the inductance and turn ratio of the transformer, the value of sampling resistor Rcs1, only the resistance value of resistor R5 may be calculated according to Formula (9), and the sampling error can be compensated. Further, after calculating the resistance value of the pull-up resistor R5, the resistance value of the pull-up resistance R5 can be fine-tuned through testing, in order to more accurately compensate the sampling error.

In particular embodiments, the control unit of the sampling circuit can charge the energy storage element within the turn-off delay time of the power switch, in order to determine the compensation signal according to the voltage of the energy storage element completed by charging, thereby compensating the sampling signal according to the compensation signal. Therefore, this sampling method can accurately obtain the compensation signal by charging the energy storage element within the turn-off delay time of the power switch through the current inside the integrated circuit, may reduce the circuit cost, can facilitate circuit integration, and may reduce the circuit volume.

Figure 8:
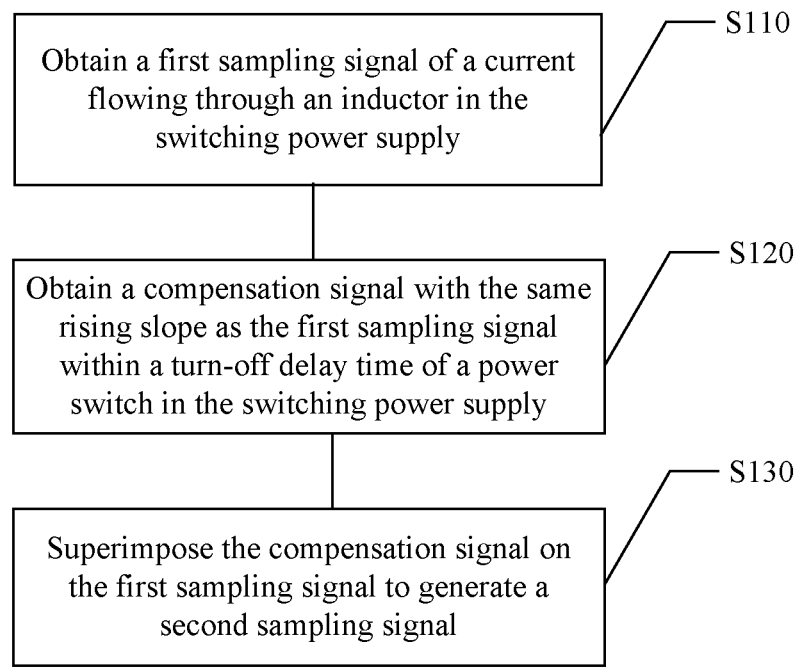
FIG. 8 is a flow diagram of an example sampling method, in accordance with embodiments of the preset invention.

Referring now to FIG. 8, shown is a flow diagram of an example sampling method, in accordance with embodiments of the preset invention. This example sampling method can be applied to the current sampling of the switching power supply. In this particular example, the signal sampling method can include the following steps. At S110, a first sampling signal of a current flowing through an inductor in the switching power supply can be obtained. In particular embodiments, an electrical signal of an auxiliary winding of a transformer can be obtained. The switching power supply can include the transformer, which may include a primary winding, a secondary winding, and the auxiliary winding. Here, when a power switch in the switching power supply is turned on, the electrical signal of the auxiliary winding is negative, and the electrical signal can characterize a bus voltage. After the power switch is completely turned off, the electrical signal of the auxiliary winding is positive. Thus, the time of turning off the power switch completely can be determined according to a zero-crossing point of the electrical signal of the auxiliary winding, and an energy storage element in a sampling circuit can be charged by a current signal of the auxiliary winding, in order to obtain a compensation signal within the turn-off delay time of the power switch.

At S120, a compensation signal with the same rising slope as the first sampling signal within a turn-off delay time of a power switch in the switching power supply may be obtained. In particular embodiments, the charging current can be determined according to the electrical signal of the auxiliary winding. In another example, the current signal of the auxiliary winding can be obtained by a detection circuit, and the charging current may be determined by mirroring the current signal of the auxiliary winding through the current mirror. At S130, the compensation signal can be superimposed on the first sampling signal, in order to generate a second sampling signal.

In particular embodiments, the energy storage element can be charged based on the charging current during the turn-off delay time of the power switch, and the voltage of the energy storage element may be determined, in order to obtain a compensation signal to compensate the sampling signal. Particular embodiments may acquire the electrical signal of the auxiliary winding of the transformer, determine the charging current according to the electrical signal of the auxiliary winding, charge the energy storage element based on the charging current within the turn-off delay time of the power switch, and determine the voltage of the energy storage element to obtain the compensation signal, thereby compensating the sampling signal. Therefore, particular embodiments may accurately obtain the compensation signal by charging the energy storage element within the turn-off delay time of the power switch through the current inside the integrated circuit. This sampling method of particular embodiments may reduce the circuit cost, facilitate circuit integration, and reduce the circuit volume.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A sampling circuit for a switching power supply, the sampling circuit comprising:
   a) a first sampling circuit configured to acquire a first sampling signal of a current flowing through an inductor in the switching power supply;
   b) a second sampling circuit configured to obtain a compensation signal with a same rising slope as the first sampling signal within a turn-off delay time of a power switch in the switching power supply, and to superimpose the compensation signal on the first sampling signal to generate a second sampling signal; and
   c) wherein the compensation signal begins to increase linearly when a control signal that controls the power switch to turn off is detected, and stops increasing linearly when a zero crossing from positive to negative is detected for the current flowing through the inductor.

2. The sampling circuit of claim 1, wherein a peak of the second sampling signal is obtained to generate a peak current sampling signal at the end of the turn-off delay time of the power switch.

3. A sampling circuit for a switching power supply, the sampling circuit comprising:
   a) a first sampling circuit configured to acquire a first sampling signal of a current flowing through an inductor in the switching power supply;
   b) a second sampling circuit configured to obtain a compensation signal with a same rising slope as the first sampling signal within a turn-off delay time of a power switch in the switching power supply, and to superimpose the compensation signal on the first sampling signal to generate a second sampling signal; and
   c) wherein the second sampling circuit comprises a current source configured to generate a charging current and a first capacitor, wherein the charging current charges the first capacitor within the turn-off delay time to generate the compensation signal on the first capacitor.

4. The sampling circuit of claim 3, wherein the charging current is determined based on a bus voltage of the switching power supply.

5. The sampling circuit of claim 3, wherein the inductor is a primary winding of a transformer in the switching power supply, wherein the charging current is generated by obtaining an electrical signal of an auxiliary winding coupled with the primary winding of the transformer in the switching power supply, and charging of the first capacitor is stopped when the electrical signal of the auxiliary winding crosses zero from negative to positive.

6. The sampling circuit of claim 5, wherein:
   a) a voltage divided circuit is coupled in parallel with the auxiliary winding;
   b) the voltage divided circuit comprises an upper resistor and a lower resistor connected in series; and
   c) the charging current generated by the current source is inversely proportional to the resistance of the upper resistor, and is directly proportional to the bus voltage of the switching power supply and a turn ratio of the auxiliary winding to the primary winding.

7. The sampling circuit of claim 6, wherein a resistance value of the upper resistor is configured to control the charging current to charge the first capacitor such that the rising slope of the compensation signal is the same as that of the first sampling signal.

8. The sampling circuit of claim 3, wherein the first sampling signal is stored in the first capacitor during the conduction time of the power switch, and a voltage of the first capacitor is taken as the second sampling signal at the end of the turn-off delay time of the power switch.

9. The sampling circuit of claim 3, wherein the second sampling circuit further comprises a second capacitor, wherein the first sampling signal is stored in the first capacitor and the second capacitor during the conduction time of the power switch, and a voltage at both terminals of the first capacitor is taken as the second sampling signal at the end of the turn-off delay time of the power switch.

10. The sampling circuit of claim 9, wherein the second sampling circuit further comprises a first amplifier having a first input terminal and a second input terminal respectively coupled to the first capacitor and the second capacitor, and an output terminal coupled to the first capacitor, and being configured to amplify a predetermined multiple of the first sampling signal.

11. The sampling circuit of claim 10, wherein the second sampling circuit further comprises:
    a) a first resistor coupled between the output terminal and the second first input terminal of the first amplifier; and
    b) a second resistor coupled in series between the first resistor and a ground terminal,
    c) wherein the resistance ratio of the first resistor and the second resistor is a first predetermined value.

12. A method of signal sampling method, the method comprising:
    a) obtaining a first sampling signal of a current flowing through an inductor in a switching power supply;
    b) obtaining a compensation signal with a same rising slope as the first sampling signal within a turn-off delay time of a power switch in the switching power supply;
    c) superimposing the compensation signal on the first sampling signal to generate a second sampling signal; and
    d) wherein the compensation signal begins to increase linearly when a control signal that controls the power switch to turn off is detected, and stops increasing linearly when a zero crossing from positive to negative is detected for the current flowing through the inductor.

13. The method of claim 12, wherein within the turn-off delay time of the power switch, a first capacitor is charged by a charging current generated by a current source to generate the compensation signal on the first capacitor.

14. The method of claim 13, wherein the charging current is determined based on a bus voltage of the switching power supply.

15. The method of claim 13, wherein the inductor is a primary winding of a transformer in the switching power supply, wherein the charging current is generated by obtaining an electrical signal of an auxiliary winding coupled with the primary winding of the transformer in the switching power supply, and charging of the first capacitor is stopped when the electrical signal of the auxiliary winding crosses zero from negative to positive.

16. The method of claim 15, wherein:
    a) a voltage divided circuit is coupled in parallel with the auxiliary winding;
    b) the voltage divided circuit comprises an upper resistor and a lower resistor connected in series; and
    c) the charging current generated by the current source is inversely proportional to the resistance of the upper resistor, and is directly proportional to the bus voltage of the switching power supply and a turn ratio of the auxiliary winding to the primary winding.

17. The method of claim 16, wherein the resistance value of the upper resistor controls the charging current to charge the first capacitor such that the rising slope of the compensation signal is the same as that of the first sampling signal.

18. The method of claim 13, wherein the first sampling signal is stored in the first capacitor during the conduction time of the power switch, and the voltage of the first capacitor is taken as the second sampling signal at the end of the turn-off delay time of the power switch.

* * * * *